United States Patent
Traut et al.

(10) Patent No.: US 9,152,563 B2
(45) Date of Patent: Oct. 6, 2015

(54) METHOD AND APPARATUS FOR PROCESSING SLOW INFREQUENT STREAMS

(71) Applicant: Dot Hill Systems Corporation, Longmont, CO (US)

(72) Inventors: Zachary David Traut, Denver, CO (US); Michael David Barrell, Superior, CO (US)

(73) Assignee: DOT HILL SYSTEMS CORPORATION, Longmont, CO (US)

( * ) Notice: Subject to any disclaimer, the term of this patent is extended or adjusted under 35 U.S.C. 154(b) by 0 days.

(21) Appl. No.: 14/628,882

(22) Filed: Feb. 23, 2015

(65) Prior Publication Data

US 2015/0169450 A1 Jun. 18, 2015

Related U.S. Application Data

(63) Continuation-in-part of application No. 13/952,733, filed on Jul. 29, 2013, and a continuation-in-part of application No. 14/456,328, filed on Aug. 11, 2014, which is a continuation-in-part of application No. 13/952,733, filed on Jul. 29, 2013, said application No. 14/456,328 is a continuation-in-part of application No. 13/952,749, filed on Jul. 29, 2013.

(60) Provisional application No. 61/772,266, filed on Mar. 4, 2013, provisional application No. 61/772,691, filed on Mar. 5, 2013.

(51) Int. Cl.
*G06F 3/06* (2006.01)
*G06F 12/08* (2006.01)

(52) U.S. Cl.
CPC ........ *G06F 12/0806* (2013.01); *G06F 12/0813* (2013.01); *G06F 12/0862* (2013.01); *G06F 12/0866* (2013.01); *G06F 3/0604* (2013.01); *G06F 3/0646* (2013.01); *G06F 3/0689* (2013.01); *G06F 2212/6026* (2013.01); *G06F 2212/621* (2013.01)

(58) Field of Classification Search
CPC ... G06F 3/0689; G06F 3/0604; G06F 3/0646; G06F 12/0866
USPC .......................................... 711/113, 142, 143
See application file for complete search history.

(56) References Cited

U.S. PATENT DOCUMENTS

| | | |
|---|---|---|
| 5,381,528 A | 1/1995 | Brunelle |
| 5,410,653 A | 4/1995 | Macon, Jr. et al. |

(Continued)

OTHER PUBLICATIONS

Notice of Allowance dated Oct. 7, 2014 for U.S. Appl. No. 13/482,314.

(Continued)

*Primary Examiner* — Than Nguyen
(74) *Attorney, Agent, or Firm* — Thomas J. Lavan

(57) ABSTRACT

A method for efficiently processing write data from a storage controller to a striped storage volume is provided. The method includes receiving, by the storage controller, a host write request including a host write request size, calculating, by the storage controller, that a time to fill a stripe including the host write request is not less than a host guaranteed write time, and processing, by the storage controller, the host write request as a write-through host write request. The time to fill the stripe is a size of the stripe divided by a data rate of a host write stream comprising the host write request. The host guaranteed write time is the maximum latency that the storage controller guarantees host write requests are committed to one of a storage controller write cache and the striped storage volume.

20 Claims, 13 Drawing Sheets

Host write request process

*stream time to fill stripe = 816 stripe size / 912 data rate

(56) References Cited

U.S. PATENT DOCUMENTS

| | | | |
|---|---|---|---|
| 5,522,054 A | 5/1996 | Gunlock et al. | |
| 5,557,767 A | 9/1996 | Sukegowa | |
| 5,600,817 A | 2/1997 | Macon, Jr. et al. | |
| 5,619,723 A | 4/1997 | Jones et al. | |
| 5,640,530 A | 6/1997 | Beardsley et al. | |
| 5,680,573 A | 10/1997 | Rubin et al. | |
| 5,687,389 A | 11/1997 | Packer | |
| 5,809,560 A | 9/1998 | Schneider | |
| 6,047,359 A | 4/2000 | Fouts | |
| 6,070,230 A | 5/2000 | Capps | |
| 6,092,141 A | 7/2000 | Lange | |
| 6,092,149 A | 7/2000 | Hicken et al. | |
| 6,108,764 A | 8/2000 | Baumgartner et al. | |
| 6,195,727 B1 | 2/2001 | Islam et al. | |
| 6,226,713 B1 | 5/2001 | Mehotra | |
| 6,249,804 B1 | 6/2001 | Lam | |
| 6,286,080 B1 | 9/2001 | Galbraith et al. | |
| 6,321,300 B1 | 11/2001 | Ornes et al. | |
| 6,338,115 B1 | 1/2002 | Galbraith et al. | |
| 6,349,326 B1 | 2/2002 | Lam | |
| 6,505,268 B1 | 1/2003 | Schultz et al. | |
| 6,523,086 B1 | 2/2003 | Lee | |
| 6,549,977 B1 | 4/2003 | Horst et al. | |
| 6,567,892 B1 | 5/2003 | Horst et al. | |
| 6,701,413 B2 | 3/2004 | Shirai et al. | |
| 6,775,794 B1 | 8/2004 | Horst et al. | |
| 6,785,771 B2 | 8/2004 | Ash et al. | |
| 6,789,171 B2 | 9/2004 | Desai et al. | |
| 6,842,792 B2 | 1/2005 | Johnson et al. | |
| 6,877,065 B2 | 4/2005 | Galbraith et al. | |
| 6,910,099 B1 | 6/2005 | Wang et al. | |
| 6,915,404 B1 | 7/2005 | Desai et al. | |
| 6,931,486 B2 | 8/2005 | Cavallo et al. | |
| 6,965,966 B1 | 11/2005 | Rothberg et al. | |
| 7,069,354 B2 | 6/2006 | Pooni et al. | |
| 7,080,208 B2 | 7/2006 | Ashmore et al. | |
| 7,120,753 B2 | 10/2006 | Accapadi et al. | |
| 7,146,467 B2 | 12/2006 | Beardon et al. | |
| 7,149,824 B2 | 12/2006 | Johnson | |
| 7,216,203 B1 | 5/2007 | Bagwadi | |
| 7,260,679 B2 | 8/2007 | Benhase et al. | |
| 7,302,530 B2 | 11/2007 | Barrick et al. | |
| 7,318,142 B2 | 1/2008 | Accapadi et al. | |
| 7,337,262 B2 | 2/2008 | Beeston et al. | |
| 7,493,450 B2 | 2/2009 | Beardon | |
| 7,523,259 B2 | 4/2009 | Pistoulet | |
| 7,543,124 B1 | 6/2009 | Accapadi et al. | |
| 7,627,714 B2 | 12/2009 | Ash et al. | |
| 7,664,785 B2 | 2/2010 | Kano | |
| 7,721,043 B2 | 5/2010 | Gill et al. | |
| 7,724,568 B2 | 5/2010 | Arya et al. | |
| 7,779,174 B2 | 8/2010 | Lee et al. | |
| 7,853,751 B2 | 12/2010 | Manoj | |
| 7,996,623 B2 | 8/2011 | Walker | |
| 8,074,020 B2 | 12/2011 | Seaman et al. | |
| 8,255,627 B2 | 8/2012 | Blinick et al. | |
| 8,356,126 B2 | 1/2013 | Ashmore | |
| 8,478,945 B2 | 7/2013 | Ash et al. | |
| 8,700,854 B2 | 4/2014 | Ash et al. | |
| 8,788,742 B2 | 7/2014 | Benhase et al. | |
| 8,788,755 B2 | 7/2014 | Satran et al. | |
| 8,799,571 B1 | 8/2014 | Desroches et al. | |
| 8,806,122 B2 | 8/2014 | Benhase et al. | |
| 2002/0069322 A1 | 6/2002 | Galbraith et al. | |
| 2003/0041214 A1 | 2/2003 | Hirao et al. | |
| 2003/0200404 A1 | 10/2003 | Wicki et al. | |
| 2003/0225977 A1 | 12/2003 | Desai et al. | |
| 2004/0205298 A1 | 10/2004 | Beardon et al. | |
| 2004/0205299 A1 | 10/2004 | Beardon | |
| 2005/0021879 A1 | 1/2005 | Douglas | |
| 2005/0060495 A1 | 3/2005 | Pistoulet | |
| 2005/0071596 A1 | 3/2005 | Aschoff et al. | |
| 2005/0235108 A1 | 10/2005 | Hiratsuka | |
| 2005/0235125 A1 | 10/2005 | Accapadi et al. | |
| 2006/0020759 A1 | 1/2006 | Barrick et al. | |
| 2006/0069876 A1 | 3/2006 | Bansal et al. | |
| 2006/0248278 A1 | 11/2006 | Beeston et al. | |
| 2006/0248387 A1 | 11/2006 | Nicholson et al. | |
| 2006/0288186 A1 | 12/2006 | Accapadi et al. | |
| 2007/0005904 A1 | 1/2007 | Lemoal et al. | |
| 2007/0239747 A1 | 10/2007 | Pepper | |
| 2007/0276993 A1 | 11/2007 | Hirutsaka | |
| 2008/0005481 A1 | 1/2008 | Walker | |
| 2009/0077300 A1* | 3/2009 | Forbis et al. | 711/4 |
| 2009/0219760 A1 | 9/2009 | Arya et al. | |
| 2010/0169283 A1 | 7/2010 | Atluri et al. | |
| 2010/0208385 A1 | 8/2010 | Toukarin | |
| 2011/0126045 A1* | 5/2011 | Bennett | 714/6.22 |
| 2011/0145508 A1 | 6/2011 | Pelleg et al. | |
| 2012/0047548 A1 | 2/2012 | Rowlands et al. | |
| 2012/0144123 A1 | 6/2012 | Aronovich et al. | |
| 2013/0326149 A1 | 12/2013 | Barrell et al. | |
| 2014/0025770 A1* | 1/2014 | Warfield et al. | 709/213 |
| 2014/0181415 A1 | 6/2014 | Loh et al. | |
| 2014/0250268 A1 | 9/2014 | Traut et al. | |
| 2014/0258638 A1 | 9/2014 | Traut et al. | |
| 2014/0281366 A1* | 9/2014 | Felch | 711/207 |
| 2014/0351527 A1 | 11/2014 | Traut et al. | |
| 2015/0169449 A1 | 6/2015 | Barrell et al. | |

OTHER PUBLICATIONS

Notice of Allowance dated Oct. 30, 2014 for U.S. Appl. No. 14/465,291.

Notice of Allowance dated Nov. 7, 2014 for U.S. Appl. No. 14/465,291.

Official Action for U.S. Appl. No. 13/952,733, mailed May 20, 2015.

* cited by examiner

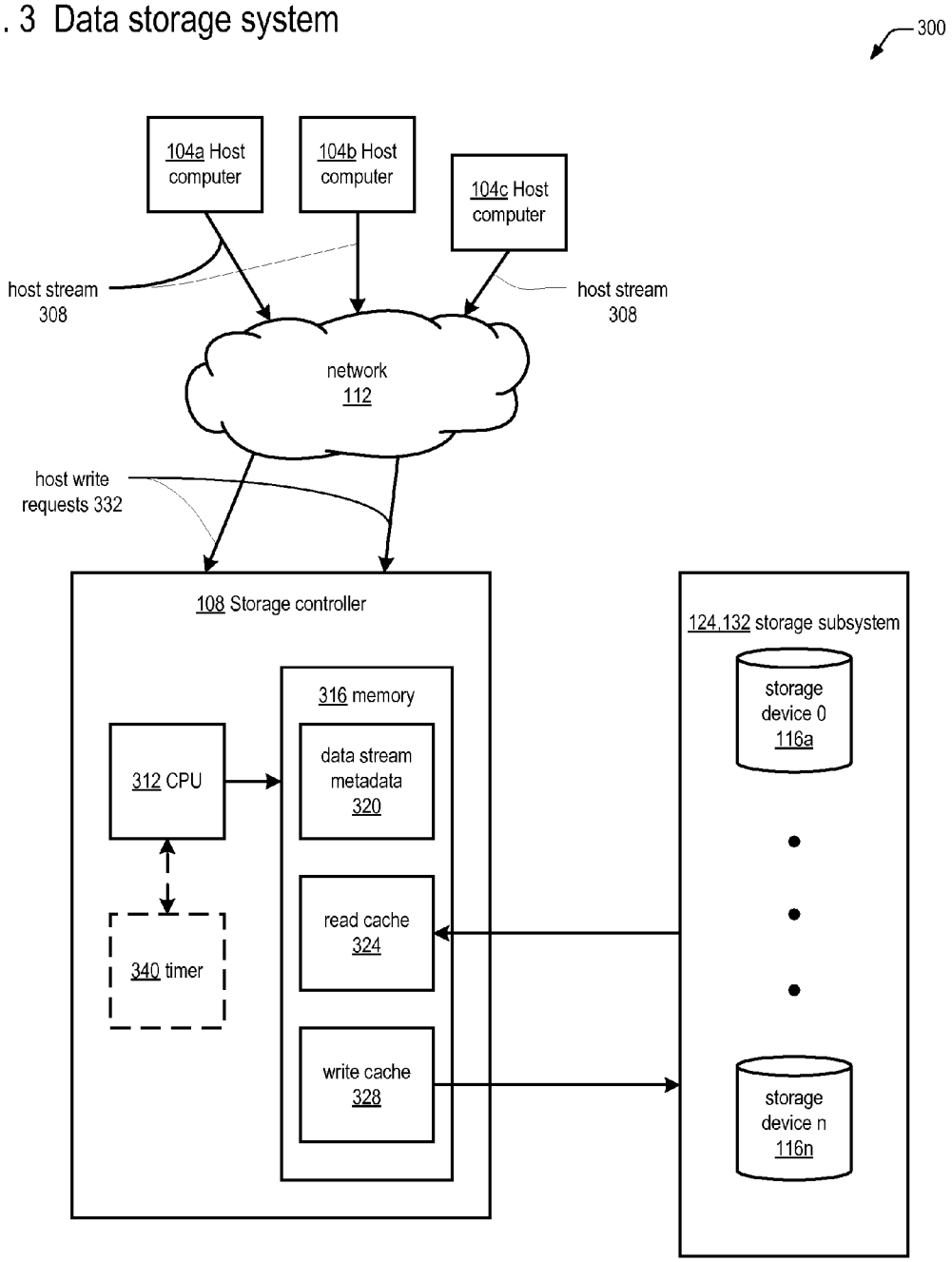
Fig. 3 Data storage system

Fig. 4a  Single storage device striped volume
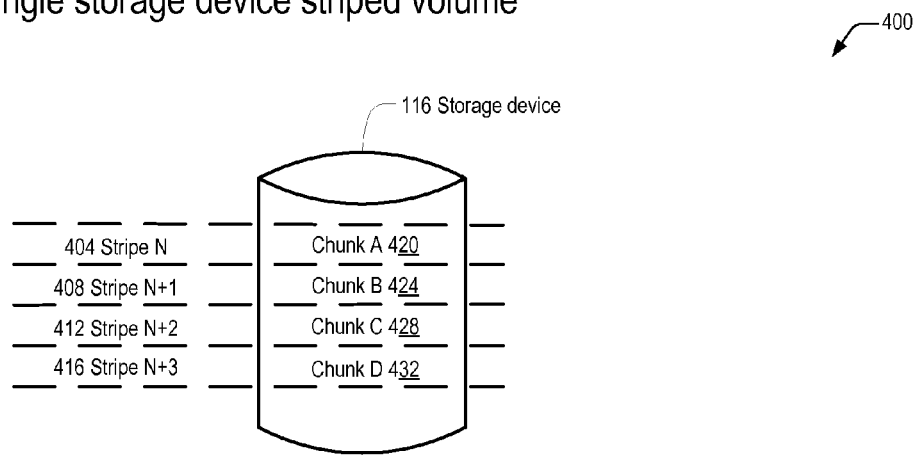
Fig. 4b  Multiple storage device striped volume
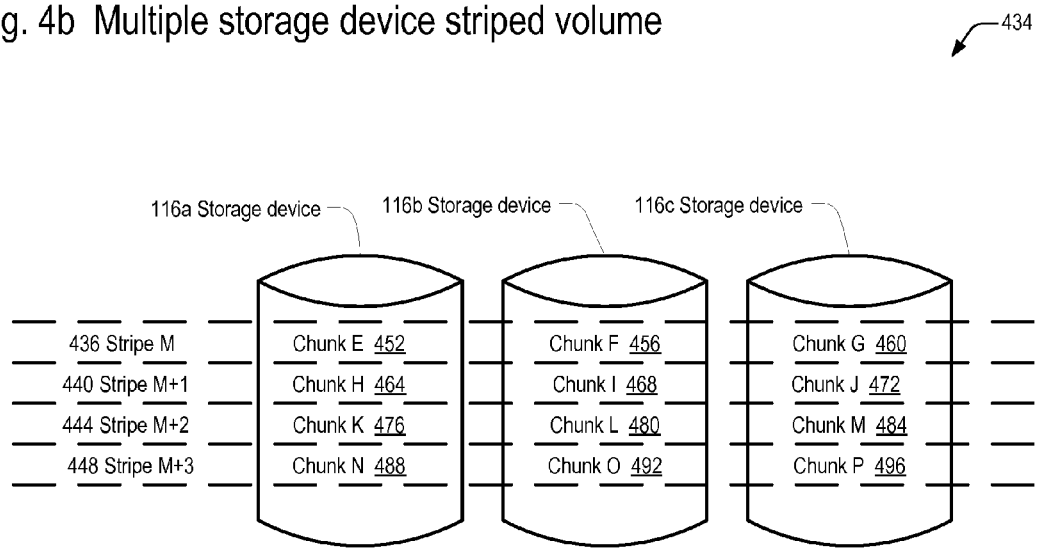

Fig. 5a  Write data stream example
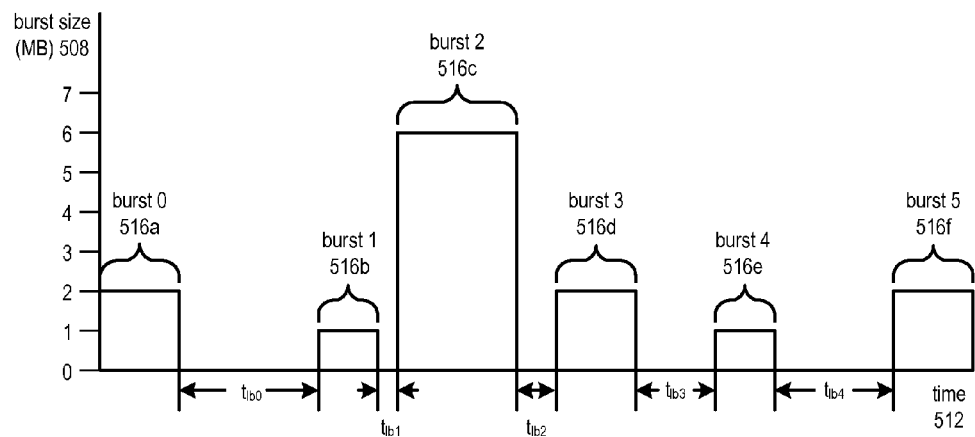
Fig. 5b  Burst parameters example
| | burst 0 516a | | burst 1 516b | burst 2 516c | burst 3 516d | burst 4 516e | | burst 5 516f |
|---|---|---|---|---|---|---|---|---|
| | | | | bursts 516 | | | | |
| burst length 520 | 2 MB | | 1 MB | 6 MB | 2 MB | 1 MB | | 2 MB |
| time since last burst ($t_{lb}$) 524 | | 200 ms | | 30 ms | 60 ms | 120 ms | 200 ms | |
←────────── time ──────────→

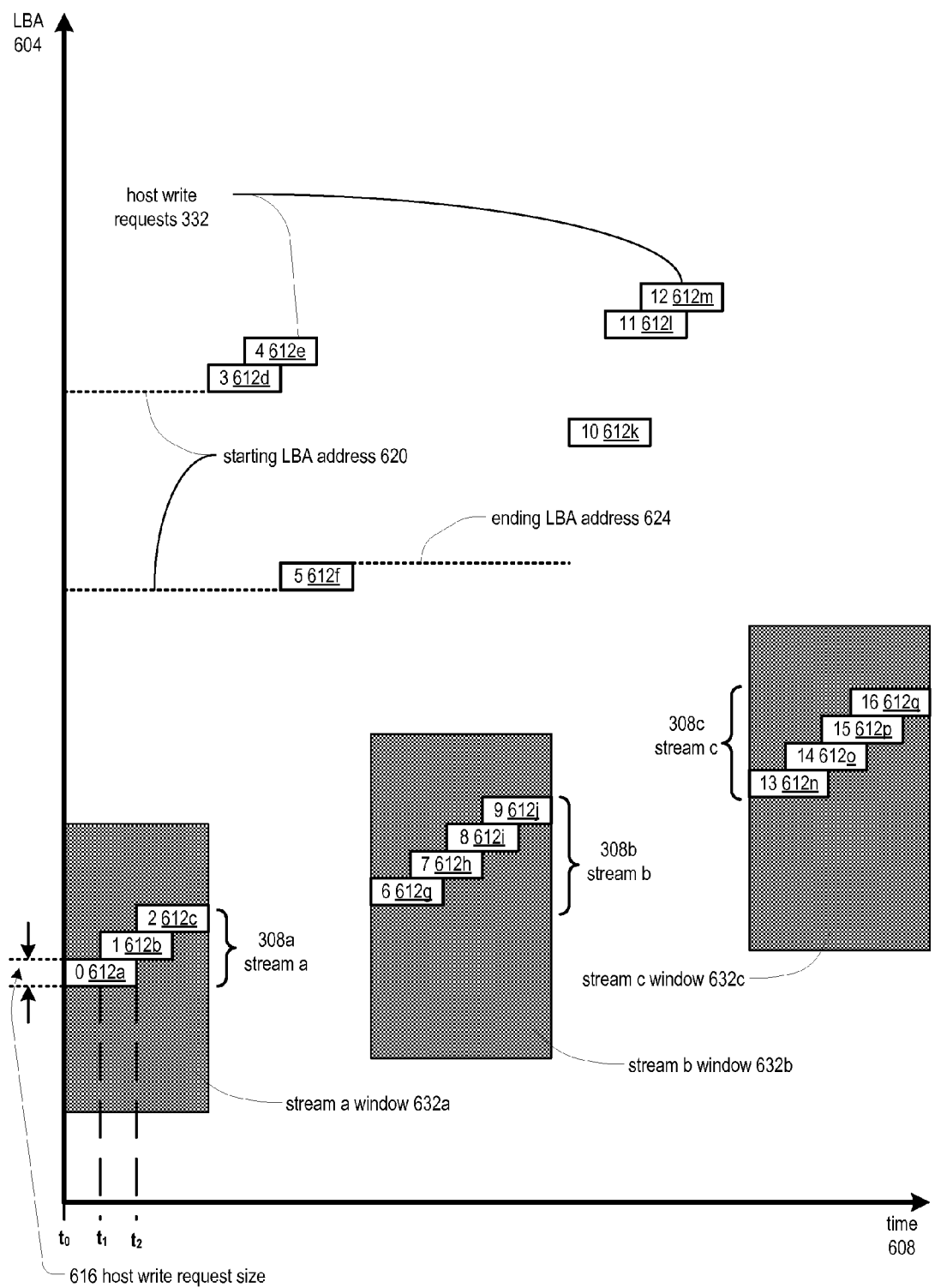
Fig. 6 Host data streams example

Fig. 7 Time to fill stripe for fast and slow streams
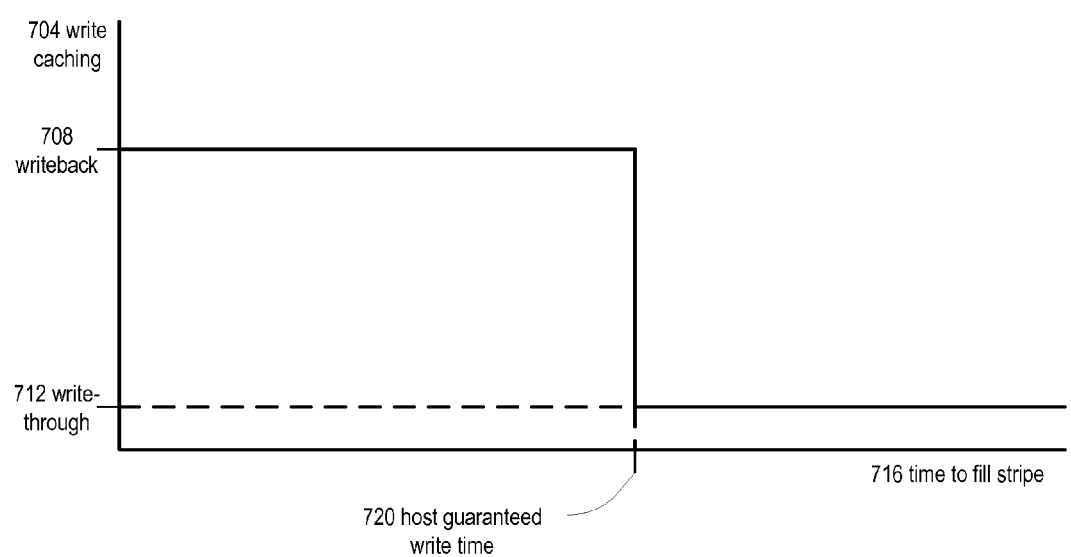

Fig. 8 Global metadata (for all streams)
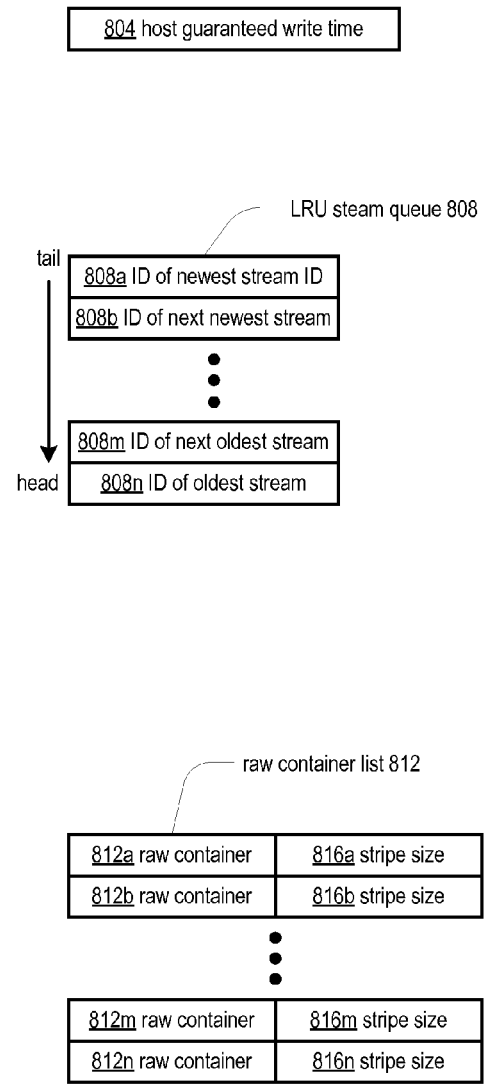

Fig. 9 Stream metadata (per-stream)
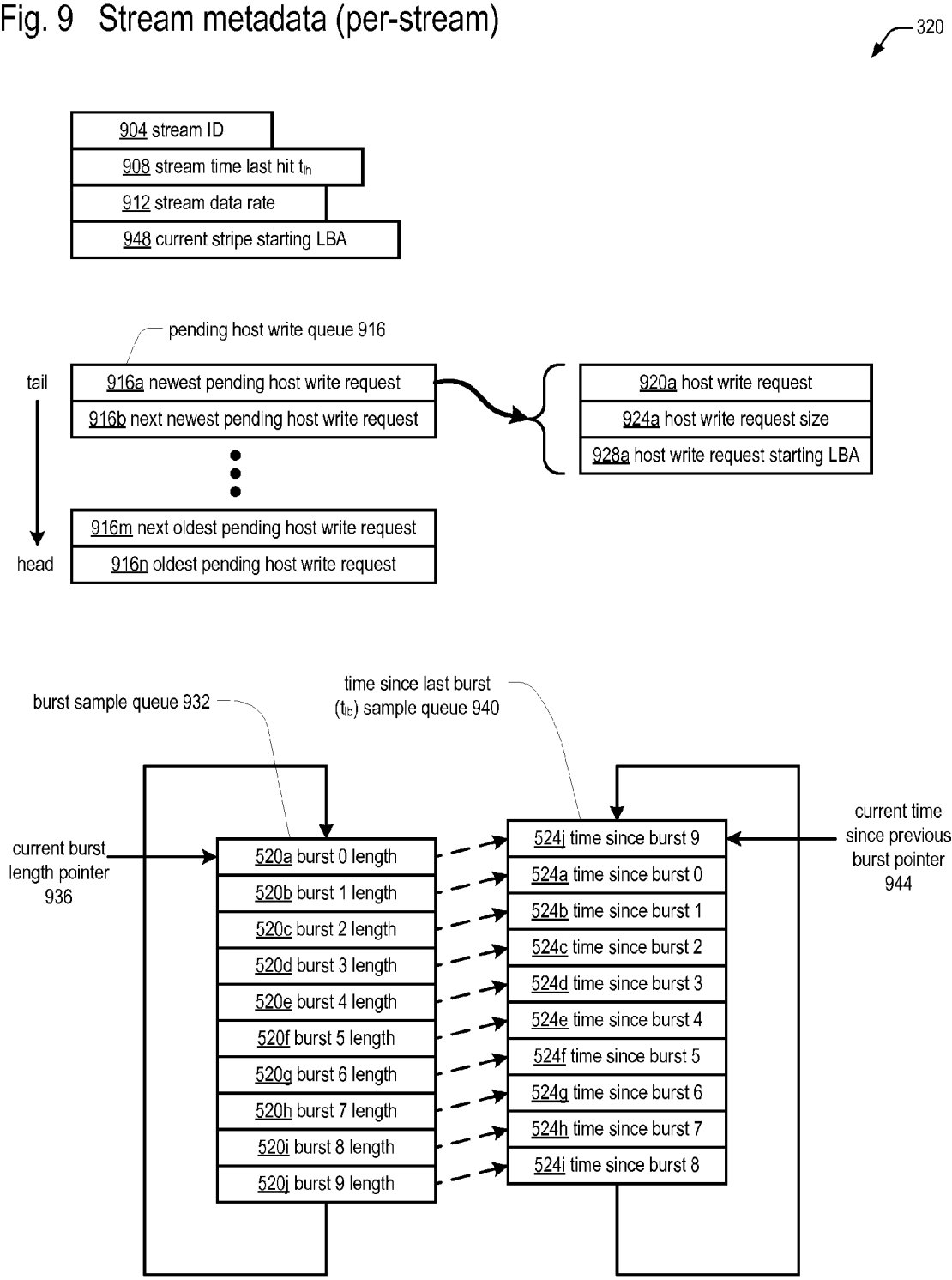

Fig. 10 Host write request process
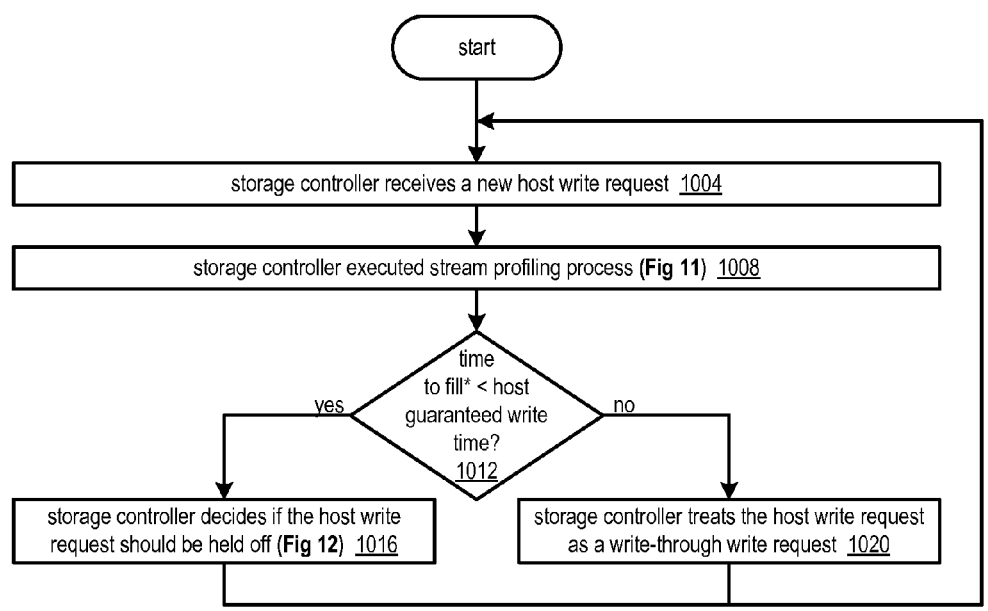
*stream time to fill stripe = $\dfrac{816 \text{ stripe size}}{912 \text{ data rate}}$ Fig. 11 Stream profiling process
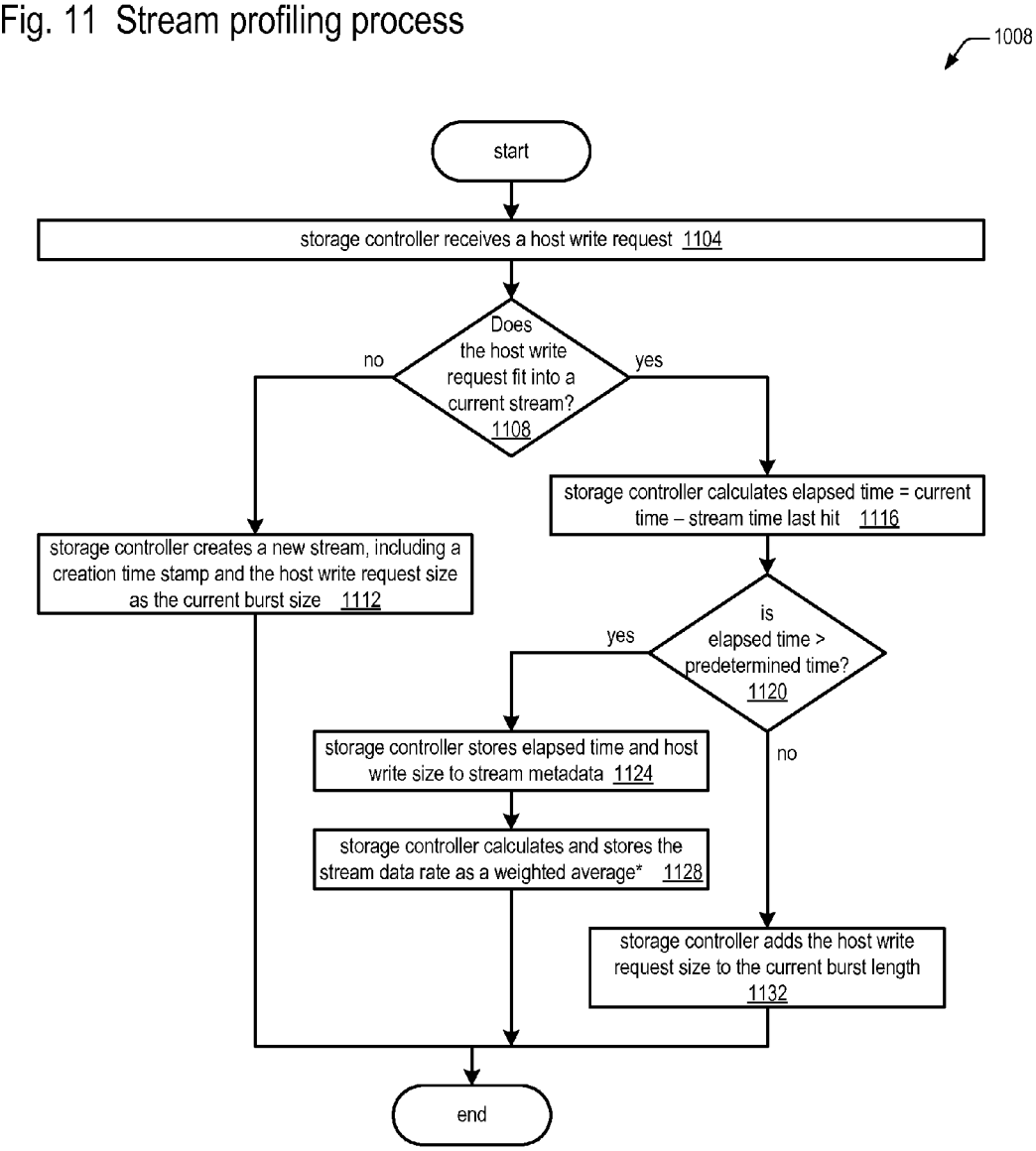

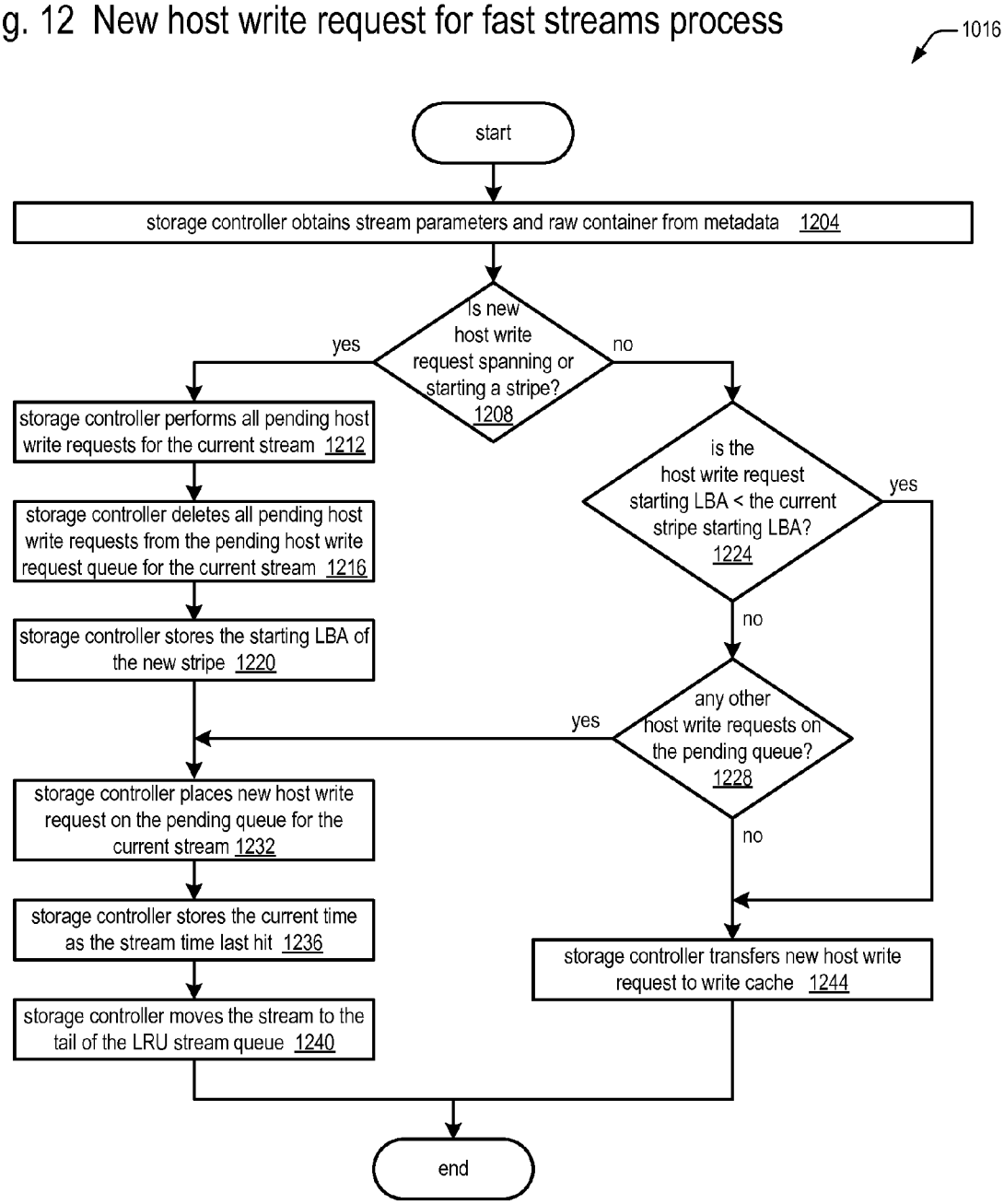
Fig. 12 New host write request for fast streams process

Fig. 13 LRU stream queue management process
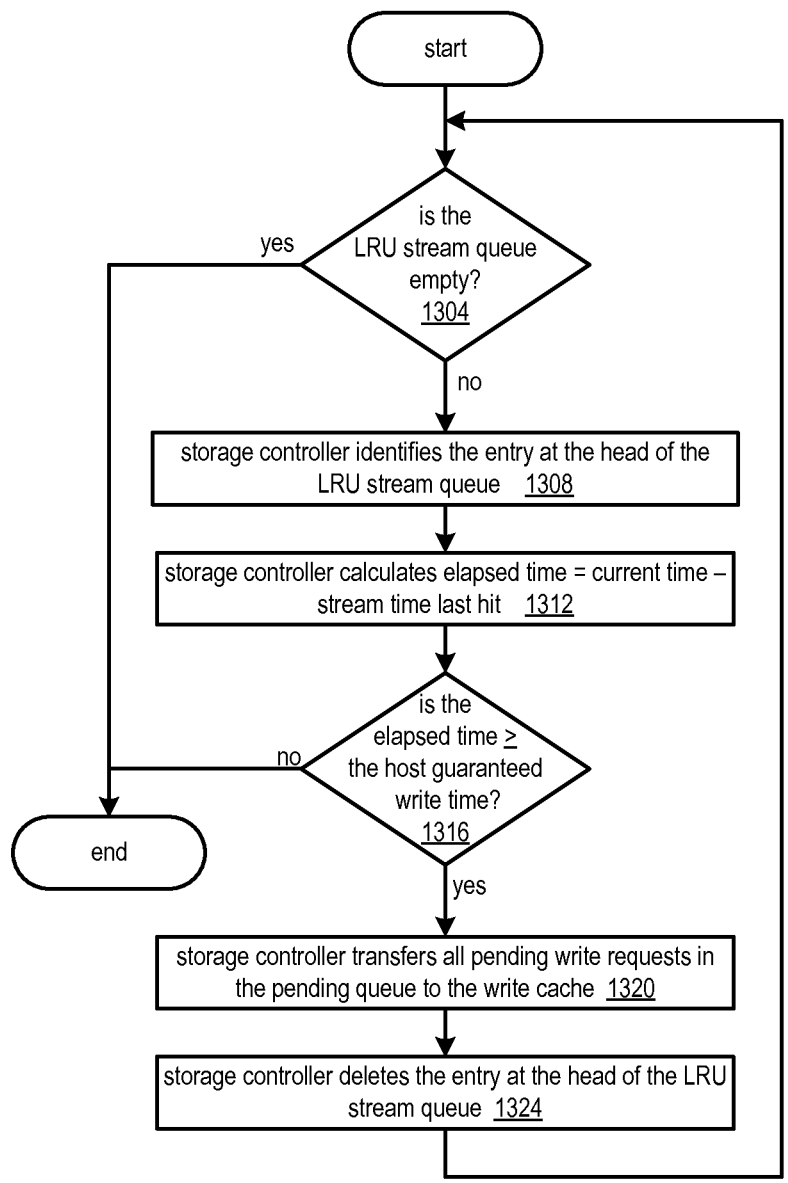

METHOD AND APPARATUS FOR PROCESSING SLOW INFREQUENT STREAMS

CROSS REFERENCE TO RELATED APPLICATION(S)

This application is a Continuation-in-Part of pending non-Provisional U.S. application Ser. No. 13/952,733 filed Jul. 29, 2013, entitled METHOD AND APPARATUS FOR EFFICIENT CACHE READ AHEAD, which claims the benefit of U.S. Provisional Application Ser. No. 61/772,266 filed Mar. 4, 2013, entitled HEURISTIC READAHEAD, which are hereby incorporated by reference for all purposes. This application is also a Continuation-in-Part of pending non-Provisional U.S. Application Ser. No. 14/456,328 filed Aug. 11, 2014, entitled METHOD AND APPARATUS FOR SEQUENTIAL STREAM I/O PROCESSING, which claims the benefit of pending U.S. Non-Provisional application Ser. No. 13/952,733 filed Jul. 29, 2013, entitled METHOD AND APPARATUS FOR EFFICIENT CACHE READ AHEAD, which claims the benefit of U.S. Provisional Application Ser. No. 61/772,266 filed Mar. 4, 2013, entitled HEURISTIC READAHEAD, and pending U.S. Non-Provisional application Ser. No. 13/952,749 filed Jul. 29, 2013, entitled METHOD AND APPARATUS FOR EFFICIENT READ CACHE OPERATION, which claims the benefit of U.S. Provisional Application Ser. No. 61/772,691 filed Mar. 5, 2013, entitled METHOD FOR HEURISTICALLY ABANDONING LRU TO PROMOTE READAHEAD, which are hereby incorporated by reference for all purposes. This application is related to copending non-Provisional U.S. application Ser. No. 14/xxx,xxx, filed Feb. 23, 2015, entitled METHOD AND APPARATUS FOR PROCESSING FAST ASYNCHRONOUS STREAMS.

FIELD

The present invention is directed to computer data storage systems. In particular, the present invention is directed to methods and apparatuses for efficiently processing host write data in a storage controller cache memory to maximize efficiency for a plurality of write streams.

BACKGROUND

In data storage systems, write performance is increased by utilizing well known data caching techniques, including write back caching. When a storage controller receives a write request from a host computer, the storage controller stores the write data in the write cache, if space is available in the write cache, and notifies the host computer that the write request is complete. This then frees up the host computer to issue additional read or write requests. If write cache space is not available, the storage controller must instead transfer the write request directly to the slower storage devices, thus degrading write performance.

Once the write data is in the write cache, the storage controller institutes various policies to determine when, which, and how much write data to transfer to destination storage devices. The actions surrounding this transfer are referred to as destaging data from the write cache. Destaging write data is important as it frees up write cache space to accept new write requests from host computers, and the data is stored on storage devices in redundant RAID configurations. Redundant RAID configurations preserve data in the event of a single storage device failure—and in some RAID configurations—multiple storage device failures. It is therefore desirable to efficiently process host write requests and destage write data from a storage controller write cache to storage devices.

SUMMARY

The present invention is directed to solving disadvantages of the prior art. In accordance with embodiments of the present invention, a method for efficiently processing write data from a storage controller to a striped storage volume is provided. The method includes receiving, by the storage controller, a host write request including a host write request size, calculating, by the storage controller, that a time to fill a stripe including the host write request is not less than a host guaranteed write time, and processing, by the storage controller, the host write request as a write-through host write request. The time to fill the stripe is a size of the stripe divided by a data rate of a host write stream comprising the host write request. The host guaranteed write time is the maximum latency that the storage controller guarantees host write requests are committed to one of a storage controller write cache and the striped storage volume.

In accordance with other embodiments of the present invention, a storage controller for efficiently processing write data from one or more host computers to a striped storage volume comprising one or more striped storage devices is provided. The storage controller includes a processor and a memory, coupled to the processor. The memory includes a write cache and a host guaranteed write time. The host guaranteed write time is the maximum latency that the storage controller guarantees host write requests are committed to one of the write cache and the striped storage volume. The storage controller receives a host write request including a host write request size, calculates that a time to fill a stripe including the host write request is not less than the host guaranteed write time, and processes the host write request as a write-through host write request. The time to fill the stripe is a size of a stripe comprising the host write request divided by a data rate of a host write stream comprising the host write request.

In accordance with still other embodiments of the present invention, a system for efficiently transferring write data to storage devices is provided. The system includes a host computer and a storage controller, coupled to the host computer. The storage controller includes a processor and memory, coupled to the processor. The memory includes a write cache. The system also includes a striped volume including one or more storage devices, coupled to the storage controller. The host computer transfers a host write request to the storage controller, where the host write request is directed to a stripe of the striped storage volume. In response to the host computer transfers the write request to the storage controller, the storage controller calculates that a time to fill the stripe is greater than a host guaranteed write time and processes the host write request as a write-through host write request The host write request is not stored in the write cache. The time to fill the stripe is the size of the stripe including the host write request divided by the data rate of a host write stream including the host write request.

An advantage of the present invention is that it determines which of a plurality of host write streams will benefit from write data caching the least compared to other current host write streams. Host write requests corresponding to such determined streams are then allowed to use write-through caching and not populate the write cache, thereby preserving limited write cache capacity for faster asynchronous streams that can more efficiently use the write cache.

Another advantage of the present invention is it minimizes the number of partial stripe writes during cache destage operations to storage devices. Partial stripe writes are much less efficient than full stripe writes, and slow infrequent streams are more likely to be in a partial stripe condition for a longer period of time than fast asynchronous streams.

Additional features and advantages of embodiments of the present invention will become more readily apparent from the following description, particularly when taken together with the accompanying drawings.

BRIEF DESCRIPTION OF THE DRAWINGS

FIG. 3 is a block diagram illustrating a data storage system in accordance with embodiments of the present invention.

FIG. 4a is a diagram illustrating a single storage device striped volume in accordance with embodiments of the present invention.

FIG. 4b is a diagram illustrating a multiple storage device striped volume in accordance with embodiments of the present invention.

FIG. 5a is a diagram illustrating an exemplary illustration of a write data stream in accordance with embodiments of the present invention.

FIG. 5b is a diagram illustrating an exemplary illustration of burst parameters in accordance with embodiments of the present invention.

FIG. 6 is a diagram illustrating exemplary host data streams in accordance with embodiments of the present invention.

FIG. 7 is a diagram illustrating time to fill stripe for fast and slow streams in accordance with embodiments of the present invention.

FIG. 8 is a diagram illustrating global metadata parameters for all streams in accordance with embodiments of the present invention.

FIG. 9 is a diagram illustrating per-stream metadata parameters in accordance with embodiments of the present invention.

FIG. 10 is a flowchart illustrating a host write request process in accordance with embodiments of the present invention.

FIG. 11 is a flowchart illustrating a stream profiling process in accordance with embodiments of the present invention.

FIG. 12 is a flowchart illustrating a new write request for fast streams process in accordance with embodiments of the present invention.

FIG. 13 is a flowchart illustrating an LRU stream queue management process in accordance with embodiments of the present invention.

DETAILED DESCRIPTION

The present inventors have observed various performance problems in certain I/O workloads from host computers to storage controllers. In particular, storage controller write caches may be difficult to manage efficiently when many large write streams with differing data rates are involved. For example, if all host write streams are treated the same, the storage controller write cache will quickly fill up with partial stripes from slower streams. This either leads to the storage controller destaging partial streams from the write cache to storage devices to free up cache space, or else fast streams having to use write-through mode since no write cache space is available. Partial stripe writes include less than all of the data in a full stripe. Either of these outcomes is highly inefficient. It is therefore desirable to track the data rate for each stream and allow write cache preference for fast streams in order to maximize the number of full stripes destaged to the storage devices.

Figure 1A:
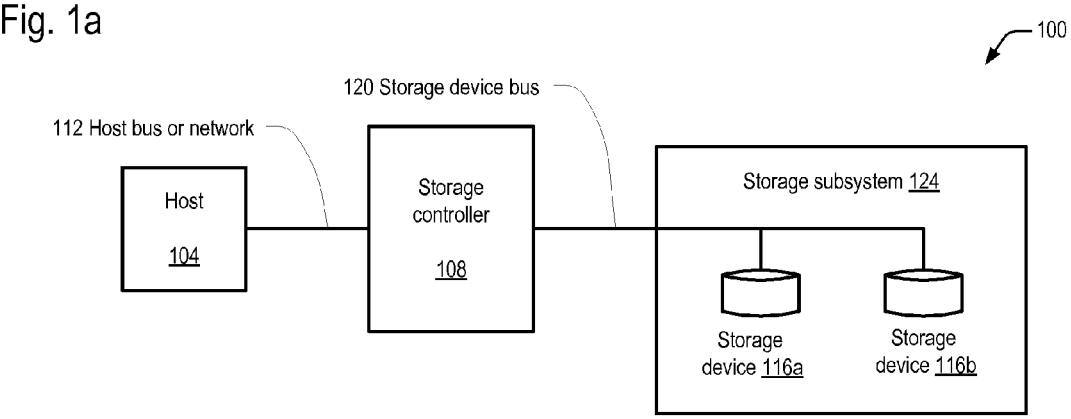
FIG. 1a is a block diagram illustrating components of a first non host-based data storage system in accordance with embodiments of the present invention.

Referring now to FIG. 1a, a block diagram illustrating components of a first non host-based data storage system 100 in accordance with embodiments of the present invention is shown.

The data storage system 100 includes one or more host computers 104. Host computer 104 is generally a server, but could also be a desktop or mobile computer. Host computer 104 executes application programs that generate read and write requests to storage controller 108 over host bus or network 112. Host bus or network 112 in one embodiment is a bus such as SCSI, FC-AL, USB, Firewire, SSA, SAS, SATA, or Infiniband. In another embodiment, host bus or network 112 is a network such as Ethernet, iSCSI, Fiber Channel, SSA, ESCON, ATM, FICON, NVMe, or Infiniband.

Host computer 104 interfaces with one or more storage controllers 108, although only a single storage controller 108 is illustrated for clarity. In one embodiment, storage controller 108 is a RAID controller. In another embodiment, storage controller 108 is a storage appliance such as a provisioning, virtualization, replication, or backup appliance. Storage controller 108 transfers data to and from storage devices 116a, 116b in storage subsystem 124, over storage device bus 120. Storage device bus 120 is any suitable storage bus or group of buses for transferring data directly between storage controller 108 and storage devices 116, including but not limited to SCSI, Fiber Channel, SAS, SATA, or SSA.

Storage subsystem 124 in one embodiment contains twelve storage devices 116. In other embodiments, storage subsystem 124 may contain fewer or more than twelve storage devices 116. Storage devices 116 include various types of storage devices, including hard disk drives, solid state drives, optical drives, and tape drives. Within a specific storage device type, there may be several sub-categories of storage devices 116, organized according to performance. For example, hard disk drives may be organized according to cache size, drive RPM (5,400, 7,200, 10,000, and 15,000, for example), queue depth, random transfer rate, or sequential transfer rate.

Figure 1B:
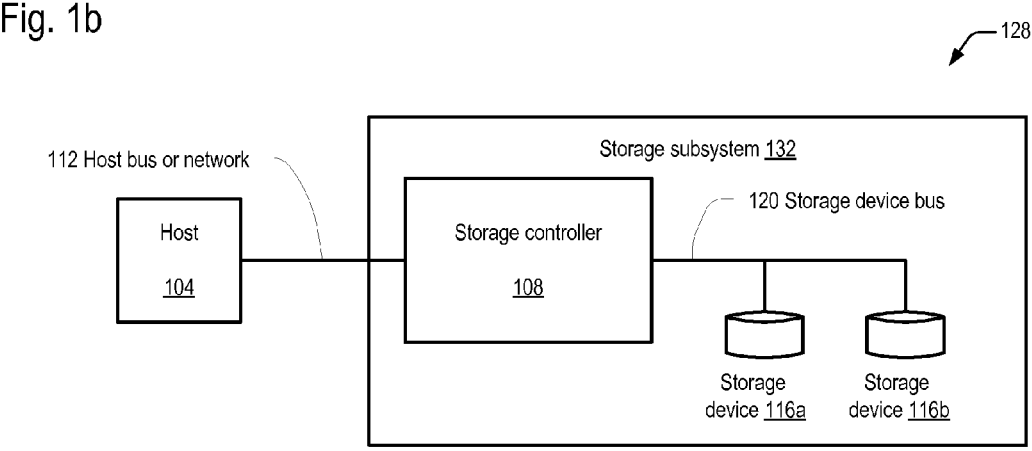
FIG. 1b is a block diagram illustrating components of a second non host-based data storage system in accordance with embodiments of the present invention.

Referring now to FIG. 1b, a block diagram illustrating components of a second non host-based data storage system 128 in accordance with embodiments of the present invention is shown. Non host-based data storage system 128 is similar to non host-based data storage system 100, with the exception being storage controller 108 is within storage subsystem 132, along with storage devices 116. In the embodiment illustrated in FIG. 1b, storage controller 108 is a single RAID controller 108. However, in other embodiments, storage controller 108 represents multiple RAID controllers 108.

Figure 1C:
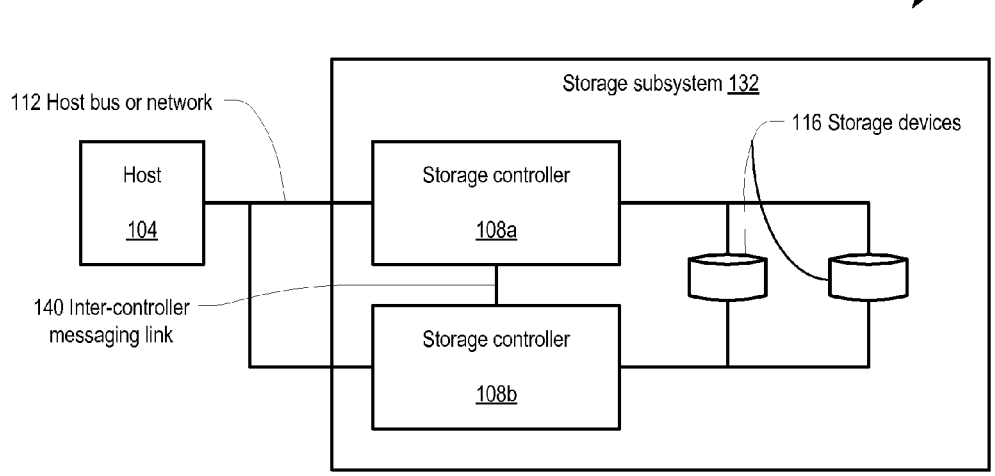
FIG. 1c is a block diagram illustrating components of a third non host-based data storage system in accordance with embodiments of the present invention.

Referring now to FIG. 1c, a block diagram illustrating components of a third host-based data storage system 136 in accordance with embodiments of the present invention is shown. Data storage system 136 is similar to data storage systems 100 and 128, except storage controller 108 represents two redundant storage controllers 108a, 108b. In one embodiment, storage controllers 108a, 108b utilize active-active failover in order to have continued availability to storage devices 116 by host 104 in the event of a failure of one of storage controllers 108a, 108b. Inter-controller messaging link 140 provides a communication and data path between storage controllers 108a, 108b in order to mirror write data and synchronize failover and failback operations.

Figure 2A:
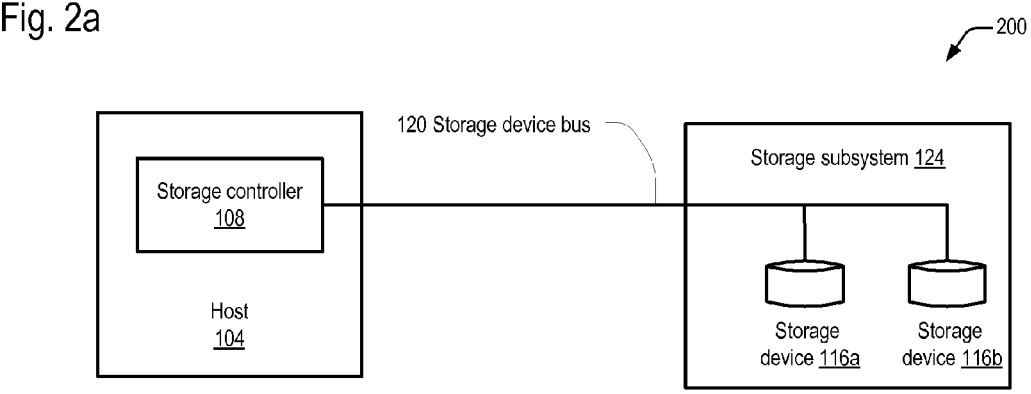
FIG. 2a is a block diagram illustrating components of a first host-based data storage system in accordance with embodiments of the present invention.

Referring now to FIG. 2a, a block diagram illustrating components of a first host-based data storage system 200 in accordance with embodiments of the present invention is shown. First host-based data storage system 200 is similar to first non host-based storage system 100 of FIG. 1a, except storage controller 108 is within host computer 104. Storage controller 108 interfaces through a local bus of host computer 104, where the local bus may be any suitable bus for high speed transfers between the CPU of host computer 104 and storage controller 108, including Rapid IO, PCI, PCI-X, or PCI Express. Storage controller 108 may either be integrated on the motherboard of host computer 104, or may be an add-in board or other form of assembly in host computer 104.

Figure 2B:
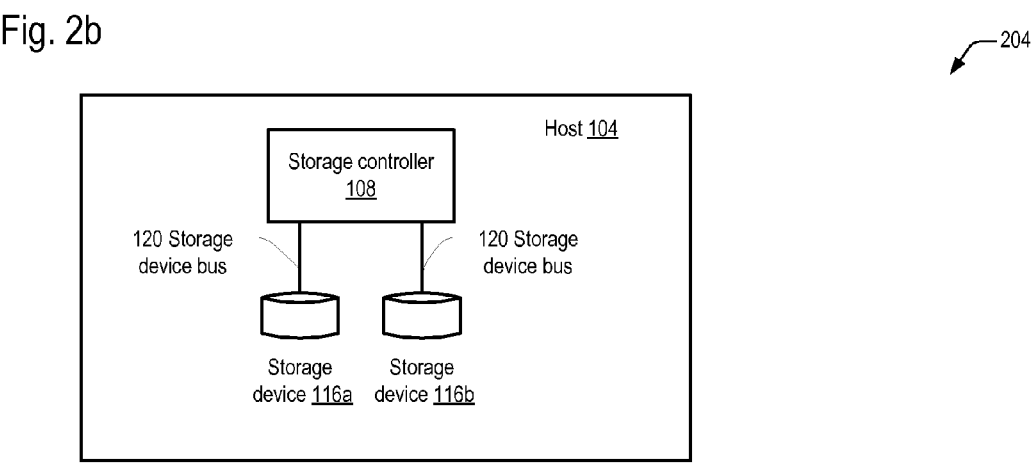
FIG. 2b is a block diagram illustrating components of a second host-based data storage system in accordance with embodiments of the present invention.

Referring now to FIG. 2b, a block diagram illustrating components of a second host-based data storage system 204 in accordance with embodiments of the present invention is shown. Second host-based data storage system 204 integrates the functions of storage subsystem 124 into host computer 104. Data storage system 204 represents a self-contained highly integrated data storage system.

Figure 2C:
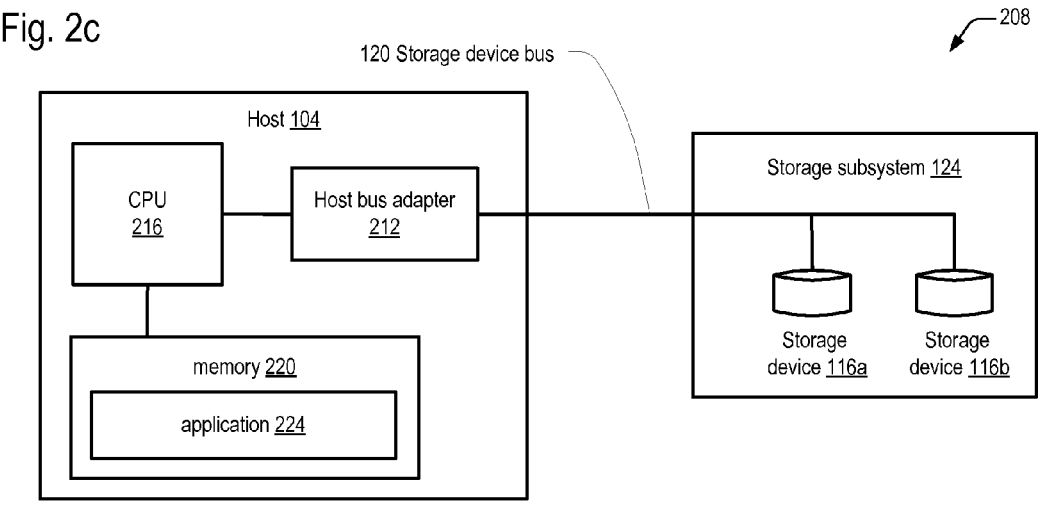
FIG. 2c is a block diagram illustrating components of a third host-based data storage system in accordance with embodiments of the present invention.

Referring now to FIG. 2c, a block diagram of illustrating components of a third host-based data storage system 208 in accordance with embodiments of the present invention is shown. Third host-based data storage system 208 is similar to first host-based data storage system 200, but instead of an integrated storage controller 108, a software-based approach is used. Interface between host computer 104 and storage device bus 120 is provided by host bus adapter 212, which provides appropriate data and command buffering functions as well as protocol control and low-level error handling. CPU 216 executes applications 224 in memory 220 to control data flow between memory 220 and storage devices 116a, 116b in storage subsystem 124.

Referring now to FIG. 3, a block diagram illustrating a data storage system 300 in accordance with embodiments of the present invention is shown. Data storage system 300 includes one or more host computers 104 interconnected to a storage controller 108 through bus or network 112. Host computers 104 generate host streams 308, which are sets of LBA-sequential host write requests 332 either moving in the positive or negative direction over time. Each host computer 104 may generate any number of host streams 308.

Storage controller 108 includes a CPU or processor 312, which executes program instructions stored in a memory 316 coupled to the CPU 312. CPU 312 includes any processing device suitable for executing storage controller 108 programs, such as Intel x86-compatible processors, embedded processors, mobile processors, and/or RISC processors. CPU 312 may include several devices including field-programmable gate arrays (FPGAs), memory controllers, North Bridge devices, and/or South Bridge devices.

Memory 316 may be one or more forms of volatile memory 316, non-volatile memory 316, or a combination of both volatile and non-volatile memories 316. The memory 316 includes firmware which includes program instructions that CPU 312 fetches and executes, including program instructions for the processes of the present invention. Examples of non-volatile memory 316 include, but are not limited to, flash memory, SD, SSD, EPROM, EEPROM, hard disks, and NOVRAM. Volatile memory 316 stores various data structures and user data. Examples of volatile memory 316 include, but are not limited to, SRAM, DDR RAM, DDR2 RAM, DDR3 RAM, Z-RAM, TTRAM, A-RAM, ETA RAM, and other forms of temporary memory.

Memory 316 includes a read cache 324 and a write cache 328, which provide improved read and write performance, respectively, to the host computers 104. Memory 316 also includes data stream metadata 320. Data stream metadata 320 stores parameters related to host write requests 332, and is used to control data write operations.

Storage controller 108 is coupled to storage subsystem 124, 132, which includes one or more striped storage devices 116, which may be organized into any number of virtual disks (VDisks) or striped storage volumes 400, 434. Each virtual disk includes one or more storage devices 116. Frequently accessed data is read from virtual disks into the read cache 324, where it can be provided in response to host read requests much faster than directly from the virtual disks. Write data is preferably initially stored in the write cache 328, which is much faster than writes sent directly to virtual disks.

In some embodiments, storage controller 108 includes timers 340. Timers 340 may be hardware timers controlled by CPU 312, or it may be software routines that execute on CPU 312. Timers 340 measure host write request 332 parameters, and is discussed in the following description and figures. Timers 340 may represent any number of timers, and in the present invention there is one timer 340 allocated globally to all host write requests 332.

It should be understood that storage controller 108 may be functionally organized in countless different functional organizations and architectures without diverting from the scope or operation of the present invention.

Referring now to FIG. 4a, a block diagram illustrating components of a single storage device striped volume 400, in accordance with embodiments of the present invention is shown.

A single storage device 116, or a portion of a single storage device 116, may be a striped volume 400. Storage device 116 may be a hard disk drive, optical drive, tape drive, solid state device, or any other form of mass data storage device. A striped volume 400 is a logical volume comprising two or more evenly sized stripes. The portion of a stripe on one storage device 116 is a chunk.

FIG. 4a illustrates a striped volume 400 having four stripes: stripe N 404, stripe N+1 408, stripe N+2 412, and stripe N+3 416. Stripe N 404 has chunk A 420, stripe N+1 408 has chunk B 424, stripe N+2 412 has chunk C 428, and stripe N+3 416 has chunk D 432. Although FIG. 4a illustrates a single storage device striped volume 400 with four stripes 404, 408, 412, and 416 and four chunks 420, 424, 428, and 432, it should be understood that a single storage device striped volume 400 may have fewer than four stripes/chunks or more than four stripes/chunks. Additionally, a single storage device striped volume 400 may occupy only a portion of the available data storage space on a single storage device 116, and there may be other single storage device striped volumes 400 on the same storage device 116. When a virtual disk 348 is a single storage device 116, the virtual disk stripe size is the size of a chunk 420, 424, 428, or 432.

Referring now to FIG. 4b, a block diagram illustrating components of a multiple storage device striped volume 434 in accordance with embodiments of the present invention is shown.

Multiple storage devices 116, or a portion of multiple storage devices 116, may be a striped volume 434. FIG. 4b illustrates a striped volume 434 on three storage devices 116a, 116b, and 116c. Striped volume 434 has four stripes: stripe M 436, stripe M+1 440, stripe M+2 444, and stripe M+3 448. Stripe M 436 has chunks E 452, F 456, and G 460. Stripe M+1 440 has chunks H 464, I 468, and J 472. Stripe M+2 444 has chunks K 476, L 480, and M 484. Stripe M+3 448 has chunks N 488, O 492, and P 496. Although FIG. 4b illustrates a multiple storage device striped volume 434 with four stripes 436, 440, 444, and 448 and three storage devices 116a, 116b, and 116c, it should be understood that a multiple storage device striped volume 434 may have fewer or more than four stripes or fewer or more than three storage devices 116. As used in the present invention, a "striped volume 400, 434" may be either a single storage device striped volume 400 or a multiple storage device striped volume 434. Additionally, a multiple storage device striped volume 434 may occupy only a portion of the available data storage space on a group of storage devices 116, and there may be other multiple storage device striped volumes 434 on the same group of storage devices 116. When a virtual disk 348 is multiple storage devices 116, the virtual disk stripe size is the combined size of the chunks in a stripe: either chunks 452+456+460, 464+468+472, 476+480+484, or 488+492+496 in the three-storage device 116 case of FIG. 4b Referring now to FIG. 5a, a diagram illustrating a write data stream 308 example in accordance with embodiments of the present invention is shown. A group of six bursts 516 are shown received over time 512 by a storage controller 108, with burst size 508 in Megabytes (MB) shown for each burst 516. The example illustrated in FIG. 5a depicts six bursts 516 of sequential host write requests 332, identified as burst 0 516a, burst 1 516b, burst 2 516c, burst 3 516d, burst 4 516e, and burst 5 516f.

The time between bursts $t_{1b}$ is shown between every two consecutive bursts 516. The time between burst 0 516a and burst 1 516b is $t_{1b0}$. The time between burst 1 516b and burst 2 516c is $t_{1b1}$. The time between burst 2 516c and burst 3 516d is $t_{1b2}$. The time between burst 3 516c and burst 4 516d is $t_{1b3}$. The time between burst 4 516d and burst 5 516e is $t_{1b4}$.

Referring now to FIG. 5b, a diagram illustrating burst 516 parameters in accordance with embodiments of the present invention is shown. FIG. 5b references the example of FIG. 5a to illustrate burst parameters stored in data stream metadata 320. A write data stream 308 includes one or more bursts 516.

Each burst 516 has an associated burst length 520 parameter, with burst 0 516a having a burst length 520 of 2 MB, burst 1 516b having a burst length 520 of 1 MB, burst 2 516c having a burst length 520 of 6 MB, burst 3 516d having a burst length 520 of 2 MB, burst 4 516e having a burst length 520 of 1 MB, and burst 5 516f having a burst length 520 of 2 MB. Between each burst 516 is a time since last burst $t_{1b}$ 524. $T_{1b0}$ is 200 ms, $T_{1b1}$ is 30 MS, $T_{1b2}$ is 60 MS, $T_{1b3}$ is 120 MS, and $T_{1b4}$ is 200 ms.

Referring now to FIG. 6, a diagram illustrating exemplary host data streams 308 in accordance with embodiments of the present invention is shown. Host data stream 308a includes multiple host write requests 332 received over time 608, where the host write requests 332 are individually identified as host write requests 612. FIG. 6 illustrates a first burst of sequential host write requests 612a, 612b, and 612c, a second burst of sequential host write requests 612g, 612h, 612i, and 612j, and a third burst of sequential host write requests 612n, 612o, 612p, and 612q. Storage controller 108 receives other non-sequential host write requests during the time that the three bursts of sequential write requests are received, and the non-sequential host write requests are identified as host write requests 612d, 612e, 612f, 612k, 612l, and 612m.

Host data streams 308 include host write requests 332, 612 that may either be sequentially increasing in LBA 604 over time 608, as shown in FIG. 6, or sequentially decreasing in LBA 604 over time 608, but not both in the same host data stream 308.

Each host write request 612 has an associated host write request size 616, and for simplicity in this example, all host write requests 612 are shown with the same host write request size 616. Additionally, each host write request 612 is addressed to an LBA range, including a starting LBA Address 620 and an ending LBA address 624. The storage controller 108 receives each host write request 612 at a specific time 608. For example, the storage controller 108 receives sequential host write request 0 612a at time $t_0$, sequential host write request 1 612b at time $t_1$, and sequential host write request 2 612c at time $t_2$.

The storage controller 108 determines if each received host write request 612 is part of a current stream 308, and this is described in more detail with respect to the following flowcharts and accompanying description. For sequential host write requests 612, the storage controller 108 establishes a stream window 632, which includes an LBA range 620, 624 based on the first host write request 612 of each host write stream 308. In the preferred embodiment, the LBA 604 range for a stream window initially depends on the host write request size 616. The storage controller 108 multiplies the host I/O request size 616 by 8 to create a stream window offset. The storage controller 108 adds the stream window offset to the host I/O request starting LBA address 620 to obtain a stream window upper LBA limit, and subtracts the stream window offset from the received host I/O request starting LBA address 620 to create a stream window lower LBA limit.

When the storage controller 108 receives a new host write request 612 that is outside the stream window 632, the stream window 632 boundaries need to change. The objective is to keep sequential host write requests 612 for the same host write stream 308 within a stream window 632. The processes the storage controller 108 uses to adjust stream windows 632 are detailed in pending non-Provisional U.S. application Ser. No. 14/456,328 filed Aug. 11, 2014, entitled METHOD AND APPARATUS FOR SEQUENTIAL STREAM I/O PROCESSING, which is herein incorporated by reference.

Referring now to FIG. 7, a diagram illustrating time to fill stripe for fast and slow streams 308 in accordance with embodiments of the present invention is shown. Write caching 704 may either be using writeback caching 708 or write-through caching 712. With writeback caching 708, the storage controller 108 initially transfers host write requests 332 to a write cache 328, and later transfers write data of the host write requests 332 to one or more storage devices 116. With write-through caching 712, the storage controller 108 initially transfers the data of host write requests 332 directly to one or more storage devices 116, thus bypassing the write cache 328.

The present invention makes a decision as to whether writeback 708 or write-through 712 caching is used for host write requests 332, depending on the time to fill a stripe 716 containing the host write request 332. High data rates will fill stripes faster than slower data rates. A predetermined value of host guaranteed write time 720 is compared to the data rate (time to fill stripe 716) in order to determine whether the storage controller 108 utilizes writeback 708 or write-through 712 caching. If the time to fill stripe 716 is less than the host guaranteed write time 720, the storage controller 108 uses writeback caching 708. Correspondingly, if the time to fill stripe 716 is greater than the host guaranteed write time 720, the storage controller 108 uses write-through caching 712. If the time to fill stripe 716 is equal to the host guaranteed write time 720, the storage controller 108 could utilize either writeback 708 or write-through 712 caching, depending on selected embodiment.

Referring now to FIG. 8, a diagram illustrating global metadata parameters 320 for all host write streams 308 in accordance with embodiments of the present invention is shown. Global metadata 320 includes a host guaranteed write time 720, 804 parameter. The host guaranteed write time 804 is the time value that the storage controller 108 guarantees data from host write requests 332 is either in the write cache 328 or one or more storage devices 116. This parameter is central to the present invention, and is important to host computer 104 applications in order to manage limited host data storage and caching resources.

Global metadata 320 also includes an LRU stream queue 808. The LRU stream queue 808 allows a storage controller 108 to keep track of the age of all active host write streams 308. Each entry in the LRU stream queue 808 is an ID value for a specific host write stream 308, such that all currently active host write streams 308 are uniquely represented. The ID for the newest host write stream 808a populates the tail of the LRU stream queue 808, while the ID for the oldest host write stream 808n populates the head of the LRU stream queue 808. The present invention adds or deletes host write streams 308 to/from the LRU stream queue 808 as conditions require.

Global metadata 320 also includes a raw container list 812. Raw containers 812 are virtualized empty and available memory 316 resources the storage controller 108 allocates to data. Raw containers 812 are data structures assigned on a stripe basis as new write data is received, and do not exceed stripe boundaries. Each such raw container 812 has a corresponding stripe size 816, and the stripe size 816 for one raw container 812 may be the same or different than the stripe size 816 for a different raw container 812. In the preferred embodiment, the storage controller 108 supports up to 64 raw containers 812.

Referring now to FIG. 9, a diagram illustrating per-stream metadata 320 parameters in accordance with embodiments of the present invention is shown. Per-stream metadata 320 parameters may be different for each host write stream 308, and all host write streams 308 have all of the parameters described in FIG. 9.

Per-stream metadata 320 parameters include a stream ID 904, a stream time last hit $t_{1h}$ 908, and a stream data rate 912. The stream ID 904 uniquely identifies the stream from other streams 308. The stream time last hit $t_{1h}$ 908 is a time stamp reflecting the time the host write stream 308 received the last host write request 332, or the time when a new host write stream 308 is created. The stream data rate 912 is a calculated parameter based on the time since last burst 524 values discussed below and in FIGS. 5a and 5b.

Per-stream metadata 320 parameters also include a pending host write queue 916, which stores metadata 320 for all pending (i.e. uncommitted) write requests 332 for the current host write stream 308. The pending host write queue 916 is organized from the newest pending host write request 916a at the tail of the queue 916, and the oldest pending host write request 916n at the head of the queue 916. Each entry of the queue 916 includes three parameters: a host write request 920, a host write request size 924, and a host write request starting Logical Block Address (LBA) 928.

Per-host write stream metadata 320 parameters further includes a pair of linked queues 932, 940 to manage burst 516 parameters in order to calculate data rate 912 for the corresponding host write stream 308.

A burst sample queue 932 is a circular queue that includes a number of locations that store a burst length 520 for each of a most recent number of bursts 516. Burst lengths 520 older than a predetermined number of burst length 520 are dropped from the queue. In the preferred embodiment, there are 10 entries in the burst sample queue 932. In other embodiments, there are less than or more than 10 entries in the burst sample queue 932. A current burst length pointer 936 identifies the current burst length 520 entry in the burst sample queue 932.

The time since last burst ($t_{1b}$) sample queue 940 stores the time between a most recent number of consecutive pairs of bursts 516. The time since last burst ($t_{1b}$) 524 was discussed in more detail with respect to FIGS. 5a and 5b. Each burst length 520 entry in the burst sample queue 932 has a corresponding time since last burst ($t_{1b}$) 524 entry in the time since last burst ($t_{1b}$) sample queue 940; therefore, there are the same number of entries in each queue 932, 940. A current time since previous burst pointer 944 identifies the current time since last burst ($t_{1b}$) 524 entry in the time since last burst ($t_{1b}$) sample queue 940.

Referring now to FIG. 10, a flowchart illustrating a host write request 332 process in accordance with embodiments of the present invention is shown. Flow begins at block 1004.

At block 1004, the storage controller 108 receives a new host write request 332 from a host computer 104. Flow proceeds to block 1008.

At block 1008, the storage controller 108 executes a stream profiling process, which associates an existing host write stream 308 with the host write request 332, if the host write stream 308 already exists. Otherwise, the storage controller 108 creates a new host write stream 308. Flow proceeds to decision block 1012.

At decision block 1012, the storage controller 108 determines if the time to fill a stripe that the host write request 332 is directed to is less than the host guaranteed write time 804. This determination is central to the present invention, and ultimately determines if the storage controller 108 will use write-through 712 or writeback 708 caching to complete the host write request 332. Recall that the host guaranteed write time 804 is the time value that the storage controller 108 guarantees data from host write requests 332 is either in the write cache 328 or one or more storage devices 116. This means the storage controller 108 sends an acknowledgement to the host computer 104 that transferred the host write request 332, which signifies the data from the host write request 332 is in either the write cache 328 or storage devices 116. If the time to fill a stripe that the host write request 332 is directed to is less than the host guaranteed write time 804, then the corresponding host write stream 308 has a fast data rate 912 and flow proceeds to block 1016. If the time to fill a stripe that the host write request 332 is directed to is not less than the host guaranteed write time 804, then the corresponding host write stream 308 has a slow data rate 912 and flow instead proceeds to block 1020.

At block 1016, the storage controller 108 decides if the host write request 332 should be held off. Held off means the storage controller 108 determines if the host write request 332 should be placed on a pending host write queue 916 for the corresponding host write stream 308 and bringing the data of the host write request 332 into the storage controller 108 should be delayed. However, in all cases (i.e. whether the host write request 332 is held off, or not), the host write request 332 is always eventually treated as a writeback 708 write request. The details of block 1016 are shown and explained in more detail by the process steps of FIG. 12.

At block 1020, the storage controller 108 treats the host write request 332 as a write-through 712 write request. This means the data rate of the host write stream 308 corresponding to the host write request 332 is slow, and therefore efficiency is improved by not storing the data of the host write request 332 in the write cache 328, and instead storing the data of the host write request 332 directly to the storage devices 116 as a write-through 712 operation. Flow proceeds to block 1004 to wait for the next host write request 332.

In an alternative embodiment, instead of measuring the time to fill a stripe, the time to fill a chunk of a stripe could instead be measured. A slow moving stream 308 could potentially take longer than the host guaranteed write time 804 to write an entire stripe, but could possibly take less than the host guaranteed write time 804 to write a chunk. All host write requests 332 belonging to the chunk could be allowed into the write cache 328. Multiple such host write requests 332 could then be coalesced into a single write to the storage device 116 containing the chunk; thereby minimizing the number of read-modify write cycles for a single chunk.

Referring now to FIG. 11, a flowchart illustrating a stream 308 profiling process in accordance with embodiments of the present invention is shown. The steps of FIG. 11 detail the process steps to perform block 1016 of FIG. 10. Flow begins at block 1104.

At block 1104, the storage controller 108 receives a host write request 332 from a host computer 104. Flow proceeds to decision block 1108.

At decision block 1108, the storage controller 108 determines if the host write request 612 fits into a current host write stream 308. If the host write request 612 fits into a current host write stream 308, then flow proceeds to block 1116. If the host write request 612 does not fit into a current host write stream 308, then flow instead proceeds to block 1112.

At block 1112, the host write request 612 does not fit into a current host write stream 308, and the storage controller 108 creates a new host write stream 308. The new host write stream 308 includes the metadata shown in FIG. 9, which includes a creation time stamp 948 and the host write request size as the current burst length 520. The current burst length 520 is identified by the current burst length pointer 936. Flow ends at block 1112, thus returning control to block 1016 and waiting for a new host write request 332 in block 1004.

At block 1116, the host write request 332 fits into a current host write stream 308 and the storage controller 108 calculates elapsed time, whereby elapsed time is equal to the current time minus the stream time last hit ($t_{1h}$) 908 for the host write stream 308 corresponding to the host write request 332. The elapsed time is simply the time since the storage controller 108 received the last host write request 332 to the current host write stream 308. The current time may be obtained from a discrete timer 340 or obtained from a timer software routine, as discussed with respect to FIG. 3. The time last hit ($t_{1h}$) 908 is obtained from metadata memory 320, and is updated whenever an existing host write stream 308 receives a new host write request 332 or the storage controller 108 creates a new host write stream 308. Flow proceeds to decision block 1120.

At decision block 1120, the storage controller 108 determines if the elapsed time calculated in block 1116 is greater than a predetermined time. The predetermined time is a time period that establishes whether the host write request 332 is part of a current burst 516 or the start of a new burst 516. In the preferred embodiment, the predetermined time is 10 milliseconds (ms). However, in other embodiments the predetermined time may be either greater than 10 ms or less than 10 ms. If the elapsed time is greater than the predetermined time, then flow proceeds to block 1124. If the elapsed time is not greater than the predetermined time, then flow proceeds to block 1132.

At block 1124, the storage controller 108 stores the elapsed time and the host write request size in metadata memory 320 for the host write stream 308 corresponding to the host write request 332. The elapsed time is stored as a time since last burst ($t_{1b}$) 524 at the location in the time since last burst ($t_{1b}$) sample queue 940 identified by the current time since last burst pointer 944. The storage controller 108 then increments the current time since last burst pointer 944. The new time since last burst ($t_{1b}$) 524 value will then be overwritten by the next elapsed time for the current host write stream 308. The host write request size 616 is stored in the burst length 520 location of the burst sample queue 932 identified by the current burst length pointer 936, after which the storage controller 108 increments the current burst length pointer 936. Flow proceeds to block 1128.

At block 1128, the storage controller 108 calculates the stream data rate 912 as a weighted average, and stores the stream data rate 912 to metadata memory 320. In the preferred embodiment, the storage controller 108 calculates the weighted average using all of the time since last burst 524 entries in the time since last burst ($t_{1b}$) sample queue 940. The most recent time since last burst 524 entry has the greatest weighting, and the least recent time since last burst 524 entry has the lowest weighting, with the other entries having evenly distributed weightings between the greatest weighting and the lowest weighting. Finally, the sum of the weighted time since last burst 524 values is divided by the factorial of the number of entries in the time since last burst ($t_{1b}$) sample queue 940. In other embodiments, the stream data rate 912 may be calculated in different and possibly more sophisticated ways in order to arrive at a more appropriate value. For example, a stream data rate 912 may be not be calculated until a storage controller 108 has received a complete history of ten bursts 516. Flow ends at block 1128, thus returning control to block 1016 and waiting for a new host write request 332 in block 1004.

At block 1132, the host write request 332 has been determined to be part of the current burst 516, and the storage controller 108 adds the host write request size 924 to the current burst length 520. The current burst length 520 is identified by the current burst length pointer 936. Flow ends at block 1132, thus returning control to block 1016 and waiting for a new host write request 332 in block 1004.

Referring now to FIG. 12, a flowchart illustrating a new host write request 332 for fast streams 308 process in accordance with embodiments of the present invention is shown. The process illustrated in FIG. 12 provides in more detail block 1016 from FIG. 10. Flow begins at block 1204.

At block 1204, the storage controller 108 obtains stream parameters and a raw container 812 from stream metadata 320. Flow proceeds to decision block 1208.

At decision block 1208, the storage controller 108 determines if the new host write request 332 spans or starts a stripe. The new host write request 332 spans the stripe if the host write request 332 includes an LBA at either the low or high boundary for a stripe. The new host write request 332 starts the stripe if the host write request 332 includes an LBA at the start of a stripe. It is advantageous for the storage controller 108 to place or store enough host write requests 332 to the host write pending queue 916 to make up a stripe, or as close as possible to a stripe. Because host write streams 308 are sequential and not random, the present invention makes the assumption that the storage controller 108 will begin tracking a new stripe, and therefore everything on the host write pending queue 916 belongs to an older stripe that should be transferred to the write cache 328, and later destaged to storage devices 116. If the new host write request 332 spans or starts a stripe, the flow proceeds to block 1212. If the new host write request 332 does not span or start a stripe, the flow proceeds to decision block 1224.

At block 1212, the storage controller 108 performs all pending host write requests 916a-n for the current stream 308 (i.e. the host write stream 308 corresponding to the host write request 332). When a host computer 104 sends a host write request 332 to a storage controller 108, the storage controller 108 initially places the host write request 332 onto a pending host write queue 916 for the host write stream 308 corresponding to the host write request 332. At this point, the storage controller 108 has not requested the data for the host write request 332 from the sending host computer 104, and the data remains in the host computer 104. Therefore, pending host write requests 916a-n are host write requests 332 received by the storage controller 108 but the data itself has not yet been received.

The storage controller 108 performs pending host write requests 916a-n means the storage controller 108 requests the data for all pending host write requests 916a-n from host computers 104, and places the data in the storage controller write cache 328. Flow proceeds to block 1216.

At block 1216, there are no longer any pending host write requests 916a-n and the storage controller 108 deletes all pending host write requests 916a-n from the pending host write request queue 916 for the current host write stream 308. Flow proceeds to block 1220.

At block 1220, the storage controller 108 stores the starting LBA of the new stripe 948 in metadata memory 320. This is used in decision block 1224 to determine if the host write request 332 is part of the current stripe or a previous stripe. Flow proceeds to block 1232.

At decision block 1224, the storage controller 108 determines if the starting LBA 620 of the host write request 332 is less than the current stripe starting LBA 948. If the starting LBA 620 of the host write request 332 is less than the current stripe starting LBA 948, then the host write request 332 is not part of the current stripe and best performance will be achieved by allowing the host write request 332 into the write cache 328. In that case, flow proceeds to block 1244. If the starting LBA 620 of the host write request 332 is not less than the current stripe starting LBA 948, then flow proceeds to decision block 1228 to check for held off host write requests 332 on the pending host write queue 916.

It should be noted that the flow illustrated herein reflects the most common case of increasing sequential host write streams 308, where the next host write request 332, 612 has a higher starting LBA 620 than the current host write request 332. However, sequential host write streams 308 may sometimes be decreasing sequential host write streams 308, where the next host write request 332, 612 has a lower starting LBA 620 than the current host write request 332. It is appreciated that one of ordinary skill in the art would understand how to modify the illustrated processes of the present invention in order to accommodate any combination of increasing or decreasing sequential host write streams 308. In any case, the present invention contemplates both types of sequential host write streams 308.

At decision block 1228, the storage controller 108 determines if there are pending host write requests 916a-n on the pending host write queue 916. If there are pending host write requests 916a-n on the pending host write queue 916, then it is advantageous to add the new host write request 332 to the pending host write queue 916, and flow proceeds to block 1232. If there are not pending host write requests 916a-n on the pending host write queue 916, then it is advantageous to add the new host write request 332 directly to the write cache 328, and flow proceeds to block 1244.

At block 1232, the storage controller 108 places the new host write request 332 on the pending host write queue 916, at the tail of the queue 916, for the current host write stream 308. Flow proceeds to block 1236.

At block 1236, the storage controller 108 stores the current time as the stream time last hit $(t_{1_h})$ 908. The current time may be provided from a timer 340 or from a software routine that maintains the current time. Flow proceeds to block 1240.

At block 1240, the storage controller 108 moves the current host write stream 308 to the tail of the LRU stream queue 808, as newest stream 808a. Flow ends at block 1240, returning control to block 1016 of FIG. 10 to wait for a new host write request in block 1004.

At block 1244, the storage controller 108 transfers the new host write request 332 to the storage controller write cache 328. Flow ends at block 1244, returning control to block 1016 of FIG. 10 to wait for a new host write request in block 1004.

Referring now to FIG. 13, a flowchart illustrating an LRU stream queue 808 management process in accordance with embodiments of the present invention is shown. The process illustrated in FIG. 13 runs asynchronously to the other illustrated processes, and in the preferred embodiment runs every 1 second. It should be noted that in other embodiments, the LRU stream queue 808 management process runs less frequently or more frequently than 1 second. Flow begins at decision block 1304.

At decision block 1304, the storage controller 108 determines if the LRU stream queue 808 is empty. If the LRU stream queue 808 is empty, then no further stream management actions are necessary and flow ends at block 1304. If the LRU stream queue 808 is not empty, then one or more host write streams 308 are on the queue 808 and flow proceeds to block 1308.

At block 1308, the storage controller 108 identifies the entry at the head 808n of the LRU stream queue 808. The head 808n of the LRU stream queue identifies the oldest host write stream 308 being tracked by the storage controller 108. Flow proceeds to block 1312.

At block 1312, the storage controller 108 calculates elapsed time equal to the difference between the current time and the stream time last hit $(t_{1_h})$ 908 for the current host write stream 308. Flow proceeds to decision block 1316.

At decision block 1316, the storage controller 108 determines if the elapsed time is greater than or equal to the host guaranteed write time 804. If the elapsed time is greater than or equal to the host guaranteed write time 804, then flow proceeds to block 1320. If the elapsed time is not greater than or equal to the host guaranteed write time 804, then flow ends at decision block 1316.

At block 1320, the storage controller 108 transfers all pending host write requests 916a-n in the pending host write queue 916 to the write cache 328. Flow proceeds to block 1324.

At block 1324, the storage controller 108 deletes the entry at the head 808n of the LRU stream queue 808. This clears out stale streams 308 in order to meet the host guaranteed write time 804, even when the storage controller 108 is not receiving more host write requests 332 for a stream 308 having one or more pending host write queue 916 entries. Flow proceeds to decision block 1304 to again check if the LRU stream queue 808 is empty.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method for efficiently processing write data from a storage controller to a striped storage volume, comprising:
   receiving, by the storage controller, a host write request comprising a host write request size;
   calculating, by the storage controller, that a time to fill a stripe comprising the host write request is not less than a host guaranteed write time; and
   processing, by the storage controller, the host write request as a write-through host write request,
   wherein the time to fill the stripe is a size of the stripe divided by a data rate of a corresponding host write stream comprising the host write request, wherein the host guaranteed write time is the maximum latency that the storage controller guarantees host write requests are committed to one of a write cache and the striped storage volume.

2. The method of claim 1, wherein the host write request is not stored in the write cache, wherein write-through host write requests are stored directly to the striped storage volume.

3. The method of claim 2, wherein the corresponding host write stream is a set of LBA-sequential host write requests that are one of increasing and decreasing in LBA over time.

4. The method of claim 2, wherein after receiving the host write request and before calculating the time to fill the stripe comprising the host write request, the method further comprising:
   determining, by the storage controller, if the host write request fits into an existing host write stream, wherein:
   if the host write request does not fit into an existing host write stream, then:
      creating, by the storage controller, a new host write stream comprising:
         a time stamp identifying the time the new host write stream is created;
         a current burst length equal to the host write request size; and
         a stream window corresponding to a starting LBA of the host write request, wherein the stream window comprises a range of LBAs greater than the host write request;
   if the host write request fits into an existing host write stream, then:
      updating, by the storage controller, host write stream metadata corresponding to the host write request,
   wherein the corresponding host write stream is one of an existing host write stream and the new host write stream.

5. The method of claim 4, wherein determining if the host write request fits into an existing host write stream comprises:
   determining, by the storage controller, if a starting LBA of the host write request is within a stream window for an existing host write stream,
   wherein if the starting LBA of the host write request is within a stream window for an existing host write stream then the host write request fits into an existing host write stream, wherein if the starting LBA of the host write request is not within a stream window for an existing host write stream then the host write request does not fit into an existing host write stream.

6. The method of claim 4, wherein updating host write stream metadata corresponding to the host write request comprises:
   calculating, by the storage controller, an elapsed time for the corresponding host write stream; and
   determining, by the storage controller, if a current burst comprises the host write request, wherein the corresponding host write stream comprises the current burst;
   if the current burst comprises the host write request, then:
      incrementing, by the storage controller, a current burst length by the host write request size; and
   if the current burst does not comprise the host write request, then:
      storing, by the storage controller, the elapsed time and the host write request size to a storage controller memory; and
      calculating the data rate for the corresponding host write stream.

7. The method of claim 6, wherein the elapsed time identifies the time since the selected host write stream received a most recent host write request, wherein the elapsed time comprises the difference between a current time and the time last hit for the corresponding host write stream.

8. The method of claim 6, wherein calculating the data rate for the corresponding host write stream comprises calculating a weighted average of a predetermined number of most recent time since last burst values, wherein more recent time since last burst values provide a greater weighting to the weighted average than less recent time since last burst values, wherein a time since last burst value is the time between the last host write request of a first burst and the first host write request of a next sequential burst following the first burst.

9. The method of claim 6, wherein determining if the current burst comprises the host write request comprises:
   comparing, by the storage controller, the elapsed time to a predetermined time, wherein the predetermined time identifies the maximum latency for host write requests to be within the current burst,
   wherein if the elapsed time is not greater than the predetermined time, then the current burst comprises the host write request,
   wherein if the elapsed time is greater than the predetermined time, then the current burst does not comprise the host write request.

10. A storage controller for efficiently processing write data from one or more host computers to a striped storage volume comprising one or more striped storage devices, comprising:
    a processor; and
    a memory, coupled to the processor, the memory comprising:
       a write cache; and
       a host guaranteed write time, wherein the host guaranteed write time is the maximum latency that the storage controller guarantees host write requests are committed to one of the write cache and the striped storage volume;
    wherein the storage controller receives a host write request comprising a host write request size, calculates that a time to fill a stripe comprising the host write request is not less than the host guaranteed write time, and processes the host write request as a write-through host write request, wherein the time to fill the stripe is a size of a stripe comprising the host write request divided by a data rate of a corresponding host write stream comprising the host write request.

11. The storage controller of claim 10, wherein the host write request is not stored in the write cache, wherein write-through host write requests are stored directly to the striped storage volume.

12. The storage controller of claim 11, wherein the corresponding host write stream is a set of LBA-sequential host write requests that are one of increasing and decreasing in LBA over time.

13. The storage controller of claim 11, wherein after the storage controller receives the host write request and before the storage controller calculates the time to fill the stripe comprising the host write request, the storage controller determines if the host write request fits into an existing host write stream, wherein if the host write request does not fit into an existing host write stream, then the storage controller creates a new host write stream comprising:
 a time stamp identifying the time the new host write stream is created;
 a current burst length equal to the host write request size, and a stream window corresponding to a starting LBA of the host write request;
wherein if the host write request fits into an existing host write stream, then the storage controller updates host write stream metadata corresponding to the host write request.

14. The storage controller of claim 13, wherein the storage controller determines if the host write request fits into an existing host write stream comprises the storage controller determines if a starting LBA of the host write request is within a stream window for an existing host write stream, wherein if the starting LBA of the host write request is within a stream window for an existing host write stream then the host write request fits into an existing host write stream, wherein if the starting LBA of the host write request is not within a stream window for an existing host write stream then the host write request does not fit into an existing host write stream.

15. The storage controller of claim 13, wherein the storage controller updates host write stream metadata corresponding to the host write request comprises the storage controller calculates an elapsed time for the selected host write stream, and determines if a current burst comprises the host write request, wherein the corresponding host write stream comprises the current burst, wherein if the current burst comprises the host write request, then the storage controller increments a current burst length by the host write request size, wherein if the current burst does not comprise the host write request, then the storage controller stores the elapsed time and the host write request size to a storage controller memory and calculates the data rate for the corresponding host write stream.

16. The storage controller of claim 15, wherein the elapsed time identifies the time since the corresponding host write stream received a most recent host write request, wherein the elapsed time comprises the difference between a current time and the time last hit for the corresponding host write stream.

17. The storage controller of claim 15, wherein the storage controller calculates the data rate for the corresponding host write stream comprises the storage controller calculates a weighted average of a predetermined number of most recent time since last burst values, wherein more recent time since last burst values provide a greater weighting to the weighted average than less recent time since last burst values, wherein a time since last burst value is the time between the last host write request of a first burst and the first host write request of a next sequential burst following the first burst.

18. The storage controller of claim 17, wherein the storage controller determines if the current burst comprises the host write request comprises the storage controller compares the elapsed time to a predetermined time, wherein the predetermined time identifies the maximum latency for host write requests to be within the current burst, wherein if the elapsed time is not greater than the predetermined time, then the current burst comprises the host write request, wherein if the elapsed time is greater than the predetermined time, then the current burst does not comprise the host write request.

19. A system for efficiently transferring write data to storage devices, comprising:
 a host computer;
 a storage controller, coupled to the host computer, comprising:
  a processor; and
  a memory, coupled to the processor, comprising a write cache; and
 a striped volume comprising one or more storage devices, coupled to the storage controller,
 wherein the host computer transfers a host write request to the storage controller, wherein the host write request is directed to a stripe of the striped storage volume, wherein in response to the host computer transfers the host write request to the storage controller, the storage controller calculates that a time to fill the stripe is greater than a host guaranteed write time and processes the host write request as a write-through host write request, wherein the host write request is not stored in the write cache, wherein the time to fill the stripe is the size of the stripe comprising the host write request divided by the data rate of a corresponding host write stream comprising the host write request.

20. The system of claim 19, wherein after the storage controller receives the host write request and before the storage controller calculates the time to fill the stripe comprising the host write request, the storage controller determines if the host write request fits into an existing host write stream comprising a set of LBA-sequential host write requests, wherein if the host write request does not fit into an existing host write stream, then the storage controller creates a new host write stream comprising:
 a time stamp identifying the time the new host write stream is created; and
 a current burst length equal to a host write request size,
wherein the corresponding host write stream is one of an existing host write stream and the new host write stream, wherein if the host write request fits into the corresponding host write stream, then the storage controller updates host write stream metadata for the host write request.

* * * * *